Feb. 19, 1963     G. BAECHLI     3,077,974

BELT SUPPORTING DEVICE

Filed Oct. 1, 1959

INVENTOR:
GEORGE BAECHLI

BY *E. Wallace Beers*

ATTORNEY

United States Patent Office 3,077,974
Patented Feb. 19, 1963

3,077,974
BELT SUPPORTING DEVICE
George Baechli, New Philadelphia, Ohio, assignor to Joy Manufacturing Company, Pittsburgh, Pa., a corporation of Pennsylvania
Filed Oct. 1, 1959, Ser. No. 843,884
4 Claims. (Cl. 198—192)

This invention relates to a belt supporting device and more particularly to a flexible idler member of the suspension type having a new and improved roller construction.

At the present time various types of idler members have been designed which comprise a molded flexible material concentrically surrounding an elongated flexible cable. In general such molded material is formed into a plurality of spaced roller portions which are spaced between the ends of the flexible cable with the portions of the flexible cable between the spaced roller portions being covered by relatively thin sheaths of the molded material. (See for example United States Patent No. 2,876,890.) Such idler members are employed to support an endless movable belt for conveying material, such as coal, in which the load on the conveyor belt varies in weight and location so that the load applied to the idler member varies both as to intensity, including shock load, and in its effective point of application. Such uneven application of the load subjects the idler members to varying stresses so that in some installations failure of the idler members has occurred adjacent the outer ends thereof. Heretofore various means have been employed in spacing the rollers along the flexible cable to eliminate such stresses but none have been entirely satisfactory in their application.

Therefore one object of this invention is to provide a new and improved belt supporting device comprising a suspension idler member having strengthened end sections.

Another object of this invention is to provide a new and improved belt supporting device comprising an idler member having a novel construction of the outer roller portions and the space intermediate thereof.

A more specific object of this invention is to provide a new and improved belt supporting device comprising an idler member having a construction of the end roller portions and the spaces therebetween which substantially prevents the supporting cable from breaking near the ends thereof.

A specific object of this invention is to provide a new and improved belt supporting device comprising an elongated idler member with the end portions having a frustoconical shaped cross section.

These and other objects of this invention will be more clearly apparent when taken in conjunction with the following description and detailed drawings of the invention in which.

Figure 1:
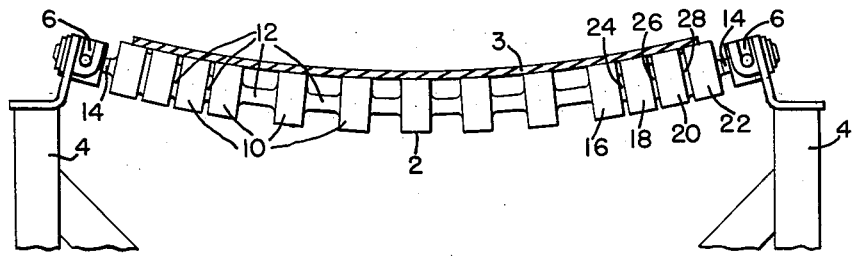
FIG. 1 is a front elevational view of a belt supporting device constructed in accordance with the principles of this invention and a suitable support therefor.

Referring to FIG. 1 a belt supporting device constructed in accordance with the principles of this invention comprises an elongated flexible idler member 2 rotatably supported in the form of a catenary between suitably spaced, vertically extending supports 4. The idler member 2 is provided with a suitable elongated, centrally located flexible element, such as a stranded steel wire cable 8, which has a plurality of longitudinally spaced roller portions 10 secured thereto intermediate the ends thereof. The portions of the cable 8 extending longitudinally between the roller portions 10 are enclosed within sheath portions 12 which are substantially smaller in diameter than the diameter of the roller portions 10. In order that the idler member 2 can properly support an endless, orbitably movable conveying belt 3 for transporting material over a surface, the outer ends of the idler member 2 are provided with suitable tubular sleeves 14, such as steel, which are suitably journaled in suitable bearings 6 which in turn are pivotally supported at the upper ends of the supports 4. The sleeves 14 are rigidly secured to the outer ends of flexible cable 8 in any suitable manner such as by being swedged thereto. Inasmuch as structures for rotatably supporting a flexible idler member are well known in the art (see Patent No. 2,876,-890) and do not constitute a part of this invention, further description thereof is not believed to be warranted.

Although the roller portions 10 and the sheath portions 12 may be formed in various manners, a molded structure is preferred in which the portions 10 and 12 are formed as a one piece unit which is bonded by the molding process to the cable 8 and with the molded portions 10 and 12 completely enclosing the cable 8 between the sleeves 14. As shown, the roller portions 10 at the ends of the idler member 2 are located more closely adjacent each other than the roller portions 10 located intermediate of such end roller portions 10. Consequently, the sheath portions 12 between the more closely adjacent end roller portions 10 are of a shorter length than those between the intermediate roller portions 10. For the purposes of this invention any suitable spacing of the intermediate roller portions 10 may be employed. The material used in molding roller portions 10 and the intermediate sheath portions 12 is preferably a resilient moldable material, such as rubber or neoprene, as is well known in the art.

Figure 2:
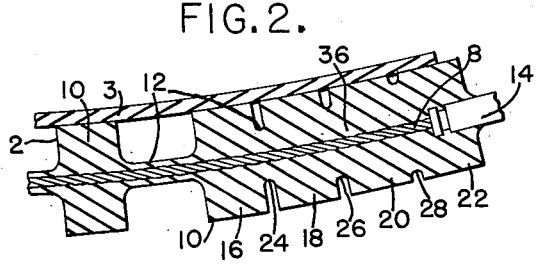
FIG. 2 is an enlarged fragmentary sectional view of the right-hand portion of the belt supporting device shown in FIG. 1.
Figure 3:
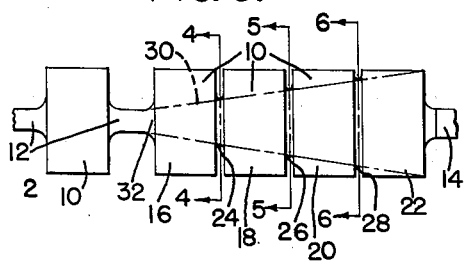
FIG. 3 is an enlarged fragmentary front view of the right-hand portion of the belt supporting device shown in FIG. 1.

As shown in FIGS. 2 and 3, four roller portions 10 are provided at the ends of the idler member 2 which are located closely adjacent each other and are identified by the reference numerals 16, 18, 20 and 22 for the purpose of clarifying this description. Thus, the outermost roller portions 10 are identified by the reference numerals 22 with the next inwardly adjacent roller portions 10 being identified by the reference numerals 20, 18, 16 respectively. For the same reason the connecting sheath portions 12 between the roller portions 16—18, 18—20, and 20—22 are identified by the reference numerals 24, 26 and 28 respectively.

Figure 4:
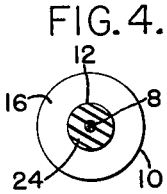
FIGS. 4, 5 and 6 are cross sectional views taken substantially along the lines 4—4, 5—5, 6—6, respectively, of FIG. 3.
Figure 5:
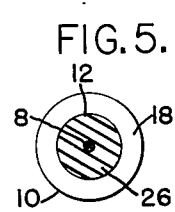
Figure 6:
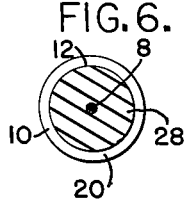

In order to accomplish the purposes of this invention the sheath portions 24, 26 and 28 (FIG. 2) have a larger diameter than that of the sheath portions 12 connecting the intermediate roller portions 10. In addition the sheath portions 24, 26 and 28 intermediate the outer roller portions 16—18, 18—20 and 20—22 respectively, have progressively increasing cross sections. Referring also to FIGS. 4, 5 and 6 the sheath portions 28 have a larger diameter than that of the sheath portions 26. Sheath portions 26 have a larger diameter than that of sheath portions 24 and sheath portions 24 have a larger diameter than that of intermediate sheath portions 12. Thus the sheath portions 24, 26 and 28 between the roller portions increase in diameter as the ends of the cable 8 are approached. Although various diameter sizes may be employed for each of the sheath portions 24, 26 and 28, they preferably are formed to provide a frusto-conical cylinder in conjunction with the roller portions 16, 18, 20 and 22. FIG. 3 illustrates in construction lines the preferred frusto-conical cone 30, the small end of which begins at the junction of the outer periphery of the sheath portions 12 with the inner face of the roller portion 16 as shown at 32 with the large end thereof being located at the outer cylindrical face of the roller portions 22. Although the frusto-conical cone 30 is shown as beginning adjacent the inner face 32 of roller portion 16, if desired, the inner end of the cone 30 may be located at an intermediate portion of the idler member 2 located closer to the center of the idler member 2.

Although the frusto-conical cone 30 is the preferred form of this invention the cross section of the sheath portions 24, 26 and 28 intermediate roller portions 16—18, 18—20 and 20—22 respectively may assume shapes other than that heretofore described such as the diameter of sheath portions 24, 26 and 28 may all have substantially the same diameters being greater than the sheath portions 12 extending therebetween.

With the described structure of this invention as shown, the additional molded material in the sheath portions 24, 26, 28 intermediate the outer roller portions 16, 18, 20 and 22 respectively, will act as a shock dampener or strain reliever to prevent high fatigue stresses in cable 8 affecting the approximate area extending between roller portions 18 and 22 indicated in FIG. 2 at 36, so that fatigue failure of the idler roller is materially reduced and the life of the molded sheath portions and flexible cable is substantially increased.

Although a preferred form of belt supporting device has been shown and described herein which incorporates the structure of this invention in accordance with the patent statutes, there are modifications that may be made therefrom other than those described which do not depart from the spirit and scope of this invention. It is therefore desired that this invention be not limited to the particular forms of belt supporting device shown and described.

What I claim is:

1. A belt supporting device comprising, an elongated idler roller having a plurality of longitudinally spaced flexible roller portions adjacent at least one end thereof, other flexibe portions extending between and connecting said roller portions respectively, said other portions having their outer peripheral surfaces spaced inwardly of the outer peripheral surfaces of said roller portions, said other portions having their outer peripheries lying in the surface of a cone which cone has its apex directed toward the longitudinal center of said idler roller, and integral rotatably supportable means concentric with said roller portions and extending longitudinally from the ends respectively of said roller portions.

2. A belt supporting device comprising, an elongated idler roller having a plurality of longitudinally spaced flexible roller portions formed thereon adjacent each end portion thereof, other flexible portions connecting said roller portions respectively, said other flexible portions having their outer peripheral surfaces spaced inwardly of the outer peripheral surfaces of said roller portions, said other flexible portions having their outer peripheries lying in the surfaces of cones, respectively, which cones have their apexes directed toward the longitudinal center of said idler roller, and end portions of said idler roller being concentric with said roller portions and being rotatably supportable.

3. A belt supporting device comprising, an elongated flexible element having a plurality of longitudinally spaced flexible roller portions concentrically secured thereon adjacent each end portion thereof, flexible sheath portions extending between and connecting said roller portions respectively, said sheath portions having their outer peripheral surfaces spaced inwardly of the outer peripheral surfaces of said roller portions, said sheath portions between the longitudinally outermost adjacent ones of said roller portions respectively being of a larger diameter than all other of said sheath portions, and adjacent ones of said sheath portions longitudinally spaced inwardly from the outermost sheath portions respectively being of a progressively smaller diameter to limit in conjunction with the outermost sheath portions the flexure of said flexible element adjacent the ends thereof.

4. A belt supporting device comprising, an elongated flexible element having a plurality of longitudinally spaced flexible roller portions formed thereon adjacent at least one end portion thereof, flexible sheath portions extending between and connecting said roller portions respectively, said sheath portions having their outer peripheral surfaces spaced inwardly of the outer peripheral surfaces of said roller portions, adjacent longitudinally inwardly spaced ones of said sheath portions being of progressively smaller diameters respectively toward the longitudinal center of said element.

References Cited in the file of this patent
UNITED STATES PATENTS 2,837,202     Baechli _____ June 3, 1958

FOREIGN PATENTS 1,037,156     France _____ Sept. 15, 1953
738,472     Great Britain _____ Oct. 12, 1955